(12) United States Patent
Khosravy et al.

(10) Patent No.: US 7,653,640 B2
(45) Date of Patent: Jan. 26, 2010

(54) TWO-WAY AND MULTI-MASTER SYNCHRONIZATION OVER WEB SYNDICATIONS

(75) Inventors: Moe Khosravy, Kirkland, WA (US); Michael R. Clark, Issaquah, WA (US); Oliver Lee, Redmond, WA (US); Lev Novik, Bellevue, WA (US); Thomas Pfenning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/461,351

(22) Filed: Jul. 31, 2006

(65) Prior Publication Data

US 2008/0126364 A1    May 29, 2008

(51) Int. Cl.
*G06F 7/00* (2006.01)
*G06F 17/00* (2006.01)
*G06F 15/16* (2006.01)

(52) U.S. Cl. .......................... 707/100; 707/102; 707/3; 707/5

(58) Field of Classification Search .................. 707/3, 707/8, 100–104.1, 201–205; 705/14, 51; 709/203–227; 715/229; 717/120–123, 168–173, 717/174–178
See application file for complete search history.

(56) References Cited

U.S. PATENT DOCUMENTS

| | | | |
|---|---|---|---|
| 6,023,708 | A | 2/2000 | Mendez et al. |
| 6,098,078 | A | 8/2000 | Gehani et al. |
| 6,185,608 | B1 | 2/2001 | Hon et al. |
| 6,324,587 | B1 | 11/2001 | Trenbeath et al. |
| 6,643,670 | B2 | 11/2003 | Parham et al. |
| 6,917,950 | B2 * | 7/2005 | Mcbride et al. ............. 707/203 |
| 7,013,316 | B1 * | 3/2006 | Hansen et al. ............. 707/204 |

(Continued)

FOREIGN PATENT DOCUMENTS

KR    1020050012881 A    2/2005

(Continued)

OTHER PUBLICATIONS

International Search Report and Written Opinion for application No. PCT/US2007/017006, dated Jan. 9, 2008, 10 pages.

(Continued)

*Primary Examiner*—Cam Y Truong
*Assistant Examiner*—Cecile Vo
(74) *Attorney, Agent, or Firm*—Senniger Powers LLP

(57) ABSTRACT

Synchronization of a web syndication item over a Really Simple Syndication (RSS) format between a publisher and a subscriber. The publisher creates the web syndication item by including a media content associated therewith. The synchronization metadata is defined to include a first virtual clock value associated with the created web syndication item. The first virtual clock value indicates when the web syndication item was last updated. A request for subscribing the published web syndication item is received from the subscriber. In response to the received request, the published web syndication item is transmitted to a location remote from the publisher and accessible by the subscriber. The first virtual clock value is provided to the subscriber for use by the subscriber to modify the first virtual clock value when the subscriber modifies the media content associated with the web syndication item.

13 Claims, 11 Drawing Sheets

U.S. PATENT DOCUMENTS

| | | | |
|---|---|---|---|
| 7,024,430 B1* | 4/2006 | Ingraham et al. | 707/201 |
| 7,251,669 B1* | 7/2007 | Arora | 707/202 |
| 2001/0027472 A1 | 10/2001 | Guan | |
| 2001/0054180 A1 | 12/2001 | Atkinson | |
| 2002/0129045 A1 | 9/2002 | Aoyama et al. | |
| 2004/0153473 A1 | 8/2004 | Hutchinson et al. | |
| 2004/0153576 A1 | 8/2004 | Hansmann et al. | |
| 2005/0010635 A1 | 1/2005 | Schwesig et al. | |
| 2005/0278392 A1* | 12/2005 | Hansen et al. | 707/201 |
| 2006/0064470 A1 | 3/2006 | Sargent et al. | |
| 2006/0080596 A1 | 4/2006 | Bhogal et al. | |
| 2006/0173985 A1* | 8/2006 | Moore | 709/223 |
| 2006/0282822 A1* | 12/2006 | Weng | 717/114 |
| 2007/0100900 A1* | 5/2007 | Gibbins | 707/201 |
| 2007/0219908 A1* | 9/2007 | Martinez | 705/51 |

FOREIGN PATENT DOCUMENTS

| | | |
|---|---|---|
| KR | 100573037 B1 | 4/2006 |
| WO | 99/27476 | 6/1999 |

OTHER PUBLICATIONS

Lynch, Kevin, "The Flash Platform," Updated Oct. 2005, 34 pgs., http://www.shockrave.com/platform/whitepapers/platform_overview.pdf, Macromedia, Inc., USA.

Legal et al., "Cross-Border BUSiness Intermediation through Electronic Seamless Services," Information Society Technologies, Nov. 2002, 77 pgs., http://www.cb-business.com/documents/D6.1.1%20-%20State%20of%20the%20Art%20Analysis%20-%20final.pdf, Information Society Technologies.

Unknown, "XML Binary Characterization Use Cases," Mar. 31, 2005, 82 pgs., http://www.w3.org/TR/xbc-use-cases/#ws-for-enterprise, www.w3.org, USA.

* cited by examiner

FIG. 2A

```
<RSS:ITEM>
  <TITLE>ITEM TITLE</TITLE>
  <LINK>ITEM LINK</LINK>
  <DESCRIPTION>ITEM DESCRIPTION</DESCRIPTION>
  ...
  <HISTORY ID="0000000000000001" LASTUPDATER="A000000000000000" DELETED="FALSE">
    <UPDATE BY="C000000000000000" SN=109 />
    <UPDATE BY="A000000000000000" SN=871 />
    <UPDATE BY="B000000000000000" SN=41 />
  </HISTORY>
</RSS:ITEM>
```

- 226: `<RSS:ITEM>` ... `<DESCRIPTION>` block
- 204: HISTORY ID
- 206: LASTUPDATER
- 208: DELETED="FALSE"
- 202: entire HISTORY element
- 228: UPDATE BY="A000..." SN=871
- 210: UPDATE BY="B000..." SN=41
- 212: SN=41

FIG. 2C

```
<RSS:CHANNEL>
   <TITLE>CHANNEL TITLE</TITLE>
230 <LINK>CHANNEL LINK</LINK>
   <DESCRIPTION>CHANNEL DESCRIPTION</DESCRIPTION>

⋮

<SUMMARY>
         <UPDATE BY="C000000000000000" SN=109 />

<UPDATE BY="A000000000000000" SN=87 />       232

<UPDATE BY="B000000000000000" SN=41 />

</SUMMARY>

</RSS:CHANNEL>
```

TWO-WAY AND MULTI-MASTER SYNCHRONIZATION OVER WEB SYNDICATIONS

BACKGROUND

Web syndication formats, such as the Really Simple Syndication (RSS) protocol, Atom protocol, or other branches of the RSS protocol, enable media content to be transmitted from disparate endpoints using a very simple specification to describe the data for others to consume. In a simplistic example, suppose user-A wishes to share his photography collections with other users. The user-A would publish his/her photographs over a RSS channel. A user-B may subscribe to the RSS channel to receive photographs from the user-A.

Frequently, the users, either the original publisher or subscribers, of web syndication items may wish to update the feed item(s) and publish the updated version(s). For example, in user-A's situation, one or more photographs may be wrong or there are typographical errors in describing parts of the photographs. Instead of submitting the updated photographs as a new item or "an episode", the publisher may wish to update the existing syndication item. Likewise, the subscriber may wish to contribute and provide updates to an existing item.

Currently, the publisher is unable to provide an update. Also, even if an update is possible, the subscriber (e.g., user-B) is unable to determine whether the subscriber has already received the updated syndication item. In addition, current RSS protocol is unable to provide a synchronous update of web synchronization items because current RSS metadata associated the web syndication item fails to account for such synchronization. Furthermore, existing RSS protocol does not provide uniform or universal clock to inform publishers or subscribers how current a particular web syndication item is.

SUMMARY

Embodiments of the invention enhance existing practices and web syndication scheme by defining synchronization metadata for each web syndication item. By having each web syndication item to include the synchronization metadata, users (both publishers and subscribers) can conveniently and efficiently publish, update, subscribe, or manage web syndication items. Aspects of the invention also configure the synchronization metadata to detect and resolve conflicts between versions of the web syndication item. In addition, alternative embodiments of the invention provide a synchronization summary for a syndication channel to provide a history of updates to one or more web syndication items associated with the syndication channel.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 2A to 2C are block diagrams illustrating exemplary implementations of synchronization metadata and update metadata according to an embodiment of the invention.

Corresponding reference characters indicate corresponding parts throughout the drawings.

DETAILED DESCRIPTION

Figure 1:
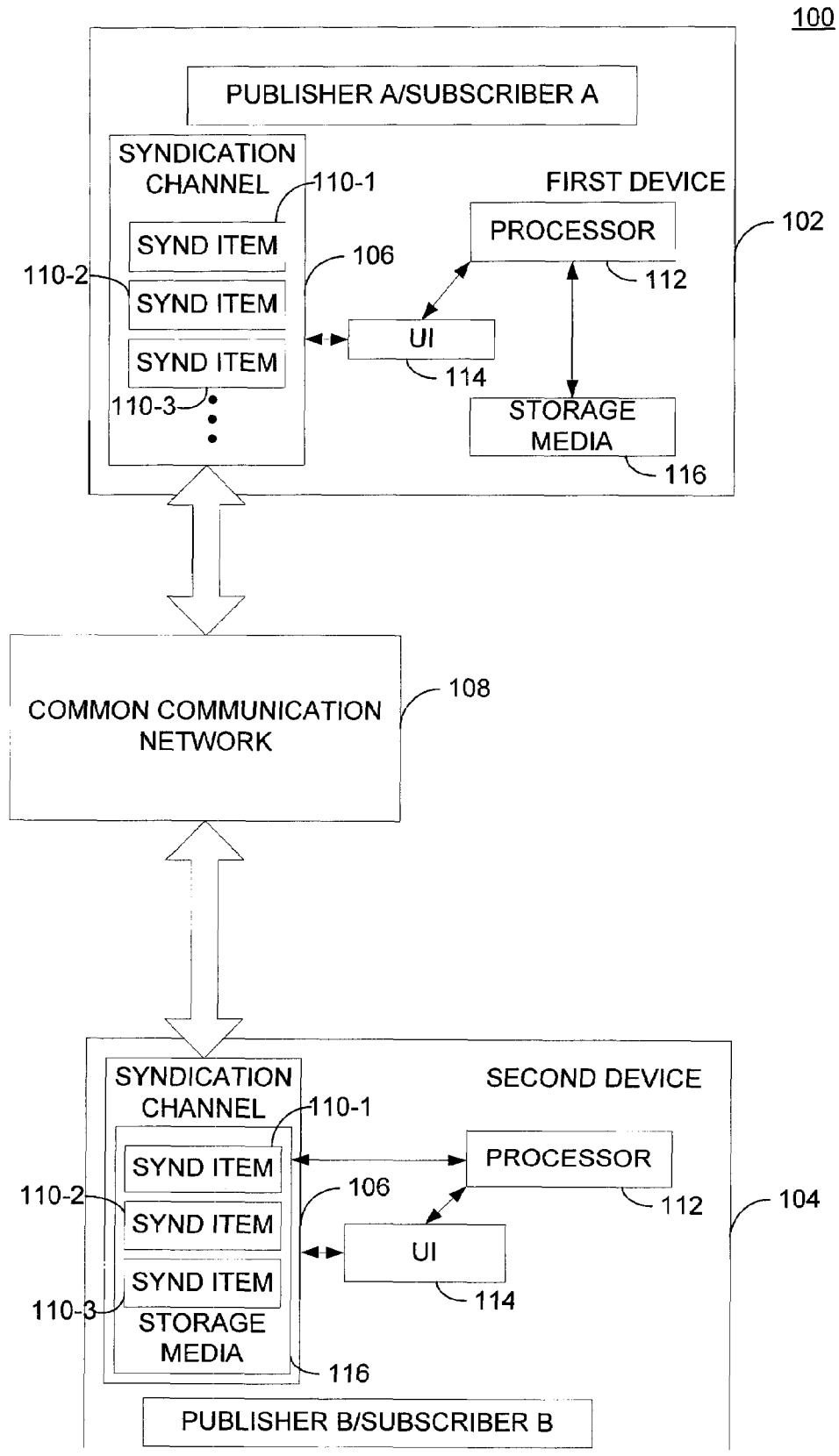
FIG. 1 is a diagram illustrating updating of web syndication items over a web syndication channel between a publisher and a subscriber according to an embodiment of the invention.

Referring first to FIG. 1, a block diagram illustrates a system 100 for updating web syndication items over a web syndication channel between a publisher and a subscriber according to an embodiment of the invention. In an exemplary example, system 100 shows a first device 102 operated by a publisher A and a second device 104 operated by a subscriber B. The first device 102 and the second device 104 may be a general computing device such as a computer, mobile computing device (e.g., personal digital assistance (PDA), a cellular phone, a portable gaming console, or the like), or a combination thereof. For instance, the first device 102 may include a processor (112) capable of processing computer-executable instructions, codes, routines, applications, software, or the like. The first device 102 also includes computer storage media 116, and a user interface (UI) 114.

For example, computer storage media 116 include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the general purpose computer (e.g., server computer 104 or client device 108). Also, the first device 102 may include communication media, which typically embody computer readable instructions, data structures, program modules, or other data in a modulated data signal such as a carrier wave or other transport mechanism and include any information delivery media. Those skilled in the art who are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media 116.

Still referring to FIG. 1, the publisher A may have media content available to be provided to the subscriber B. For example, the publisher A may have an article to share with others who may be interested in the article. As such, the publisher A establishes a syndication channel (e.g., RSS feed) 106 to make a syndication item (e.g., the article) 110 available to the subscriber B via the syndication channel 106. In turn, the subscriber B subscribes to the syndication channel 106 to receive the syndication item 110. In a further example, the publisher A may publish or post one or more items (e.g., SYNC item 110-2 and SYNC item 110-3) through the same syndication channel 106. Once the syndication items 110 are transmitted from the first device 102 to the second device 104 via a common communications network 108 (e.g., an internet, an intranet, or the like), the subscriber B may receive a copy of the syndication items 110 published by the publisher A.

For example, the publisher A may operate a web site where the publisher A provides the syndication channel for subscription (e.g., RSS feed) where the subscriber B can subscribe directly. In another example, the publisher A may provide/publish the syndication items 110 to a web syndication aggregation web site or services such that other users, such as subscriber B, may subscribe to the syndication channel 106. It is to be understood that, although examples of embodiments of the invention are described using the RSS protocol, other web syndication format or protocols may be used without departing from the scope of the invention.

Figure 2B:
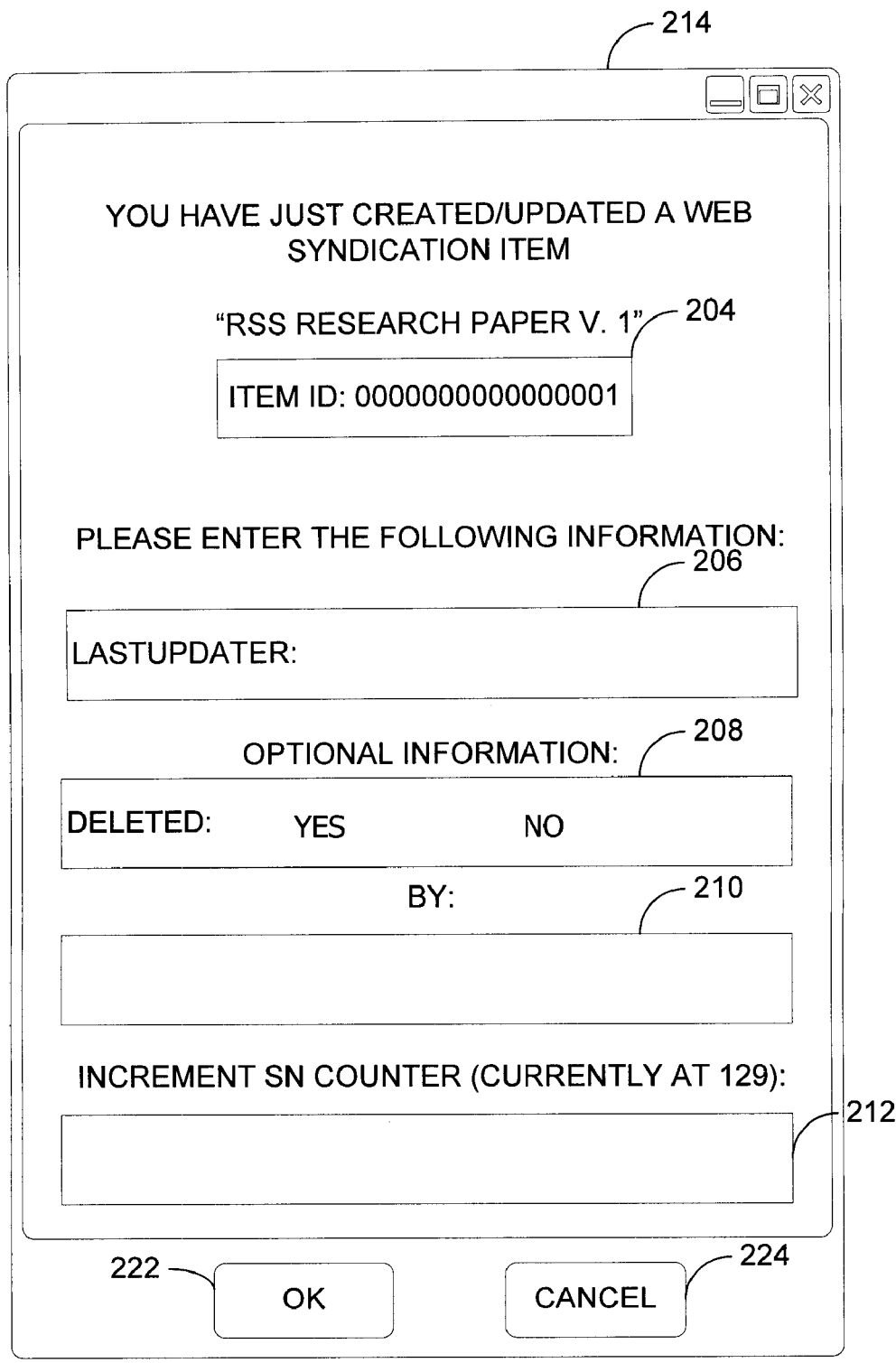

Referring now to FIGS. 2A to 2C, block diagrams illustrate exemplary implementations of synchronization metadata 202, update metadata 228, and a synchronization summary 230 according to an embodiment of the invention. For example, as illustrated in FIG. 1, the subscriber B receives the syndication items 110 published or posted by publisher A. However, suppose the subscriber B finds that there is a typographical error within the article that the publisher A published and would like to update or modify the article. Current protocol or practice would only permit the subscriber B to post a comment to the syndication channel 106 informing the publisher A that there is a typographical error. As such, existing protocol permits one-master and one-way system where the publisher A is the only individual who may modify or update the media content included in the web syndication item 110. If the subscriber B wishes to modify the article once he or she receives and stores it in the second device 104, existing web syndication protocols do not permit a synchronous transmission of the updated or modified article to the publisher A.

Referring now to FIG. 2A which illustrates an implementation of establishing or defining a synchronization metadata 202 in each of the syndication item (e.g., syndication item 110-1). Aspects of the invention apply the synchronization metadata 202 to each syndication item 110 to achieve efficient and synchronous updates to a syndication item. In this example, the synchronization metadata 202 includes the following fields and their corresponding descriptions in Table 1:

TABLE 1

Synchronization metadata fields.

| Field | Type | Description | Required |
|---|---|---|---|
| itemID | String | Globally unique ID for an item. It may be a representation of a 16 byte UUID. | Yes |
| lastUpdater | String | Globally unique ID for a person who last updates the item identified by the itemID. It may be a representation of a 16 byte UUID. | Yes |
| deleted | Boolean | Signifies the deletion of an item and designates a tombstone. | No |

In one embodiment, the synchronization metadata 202 may be implemented using a "<history>" tag in extensible markup language (XML) under the RSS format. In one embodiment, the web syndication item includes other data or metadata, such as data 226, to describe the media content associated therewith. For example, each web syndication item under the RSS protocol uses a "<item>" element, and the synchronization metadata 202 would be included under the "<history>" child element. Each <history> child element includes at least an itemID field 204, a "lastUpdater" field 206, and, optionally, a "deleted" field 208. In one embodiment, each web syndication item 110 includes exactly one <history> child element associated therewith.

Using the previous article as an illustration, the publisher A may identify the article in the itemID field 204 as "0000000000000001" and the "lastUpdater" field 206 identifies the publisher A. The publisher A may wish to leave the "deleted" field 208 blank since it is an optional field.

Within each <history> child element, one or more instances of update metadata 228 equaling to the number of unique endpoints (e.g., publisher A or subscriber B) that have made changes or modifications to the web syndication item 110. Each set of update metadata 228 includes a "by" field 210 and a "sn" time field 212. For example, Table 2 describes the update metadata 228 in further detail:

TABLE 2

Update metadata.

| Field | Type | Description | Required |
|---|---|---|---|
| by | String | Globally unique ID for a person who last updates the item identified by the itemID. Must be a representation of a 16 byte UUID. | Yes |
| sn | 64-bit or more integer value | Integer to signify "when" the by endpoint made the change. (Every time by makes an update or a set of changes that persist to the RSS feed, the tick count for "by" field is incremented). | Yes |

For example, initially, when the publisher A first publishes the web syndication item 110, the "by" field 210 may include "publisher A" and the "sn" time field 212 may include a time value indicating when an update or change is recorded. In one embodiment, the "sn" time field 212 may be a value from a clock vector (or also known as a vector clock) which is a data structure used to order events in a distributed system using a logical clock on events. In other words, the "sn" time field 212 may not be directly associated with a clock in the first device 102 (e.g., 5:05 PM GMT, Wednesday, Jul. 12, 2006) when the publisher A updates the web syndication item 110. In yet another embodiment, the "sn" time field 212 may be a virtual or logical clock value. Other representation of a virtual or logical clock value may be used without departing from the scope of the invention.

By defining the synchronization metadata 202 and the update metadata 228, embodiments of the invention enable users or endpoints (e.g., publisher A and subscriber B) to efficiently synchronize arbitrary data over RSS. In addition, aspects of the invention present the synchronization metadata 202 and the update metadata 228 (i.e., including the "sn" time field 212) to the users as they modify the media content in the web syndication item 110, such as a user interface (UI) shown in FIG. 2B. In this alternative embodiment, a dialog window 214 shows that once the web syndication item is updated (or created for the first time), a user may be presented with the dialog window 214 for updating the synchronization metadata 202 and the update metadata 228. For example, the user may confirm or modify the itemID field 204 corresponding to the web syndication item 110 to be published. Similarly, the user enters an identification value identifying the user in the "lastUpdater" field 206. The user may also optionally enter the appropriate information in the "deleted" field 208. In the update metadata 228, the user may appropriately enter the "by" field 210 and increment the "sn" field 212.

In operation, the publisher A creates a web syndication item 110 at the first device 102 by associating a media content (e.g., a document article) to the web syndication item 110. Upon creating the web syndication item 110, the publisher A defines the synchronization metadata 202 to include the values such as the itemID, "lastUpdater", and/or "deleted". The publisher A publishes the web syndication item 110 via a web syndication channel (e.g., web syndication channel 106) for other users (e.g., subscribe B) to subscribe to the web syndication channel 106.

As such, the publisher A receives a subscription request from the subscribe B and transmits the published web syndication item 110 to the subscriber B. The synchronization metadata 202 and the update metadata 228, which may be empty initially, are provided to the subscriber B as the subscriber B modifies or updates the web syndication item 110. As the subscriber B and other subscribers contribute to modification of the media content of the web syndication item 110, embodiments of the invention provide a two-way and multi-master (e.g., multi-user with content modification rights) communication using the web syndication channel. Also, without flooding the publishers or subscribers of web syndication with unnecessary metadata associated with a web syndication item, aspects of the invention simplify the scheme and provide the most relevant information to accomplish the desired results.

While the fields in the synchronization metadata 202 and the update metadata 228 as described require certain character length or data type (e.g., 16 byte or "string" data type), other data type, requirements, or data representations may be used or implemented without departing from the scope of the invention.

In one embodiment, embodiments enable conflict detection and conflict resolution of web syndication items. For example, suppose after the subscriber B receives the web syndication item 110 from the publisher A, the subscriber B wishes to update the web syndication item by modifying the media content (e.g., correcting a typographical error). The subscriber B may proceed to make changes to the media content and enter the appropriate information in the synchronization metadata 202 (e.g., "lastUpdater"=subscriber B) and the update metadata 228 (e.g., "by"=subscriber B, and "sn"=50). In order to communicate this information/changes back to the publisher A or other users who also subscribe to the same web syndication channel 106, the subscriber B may proceed to publish the updated web syndication item.

Referring now to FIG. 2C, a block diagram shows an exemplary implementation of a synchronization summary 230 for the web syndication channel 106. In one embodiment, the synchronization summary 230 includes data, metadata, and/or other information for all items for a given feed. In another embodiment, the synchronization summary 230 also includes all updates made to all web syndication items associated with the web syndication channel 106. In an alternative embodiment and exceptional case, the synchronization summary 230 may not include data, metadata, and/or information associated with an item which may have a vector information. In other words, each syndication item would have a synchronization summary listing the updates made to each syndication item and other information associated therewith.

For illustration purpose only and not by limitation, the synchronization summary 230 in FIG. 2C matches the update metadata as shown in FIG. 2A as the syndication channel 106 includes only one syndication item. With the synchronization summary 230, the users, including the publisher A and the subscriber B, can review the update history of the web syndication items belong to the web syndication channel 106.

In one embodiment, once the web syndication item is updated by the subscriber B, the updated information is transmitted and updated in the synchronization summary 230 automatically. For example, after subscriber B completes the changes to the article published by the publisher A, the update information (e.g., "lastUpdater"=subscriber B and the "sn"=50) is synchronized with the synchronization summary 230 of the web syndication channel. In one embodiment, the synchronization summary 230 for the web syndication channel is first analyzed to determine if an identical summary content is already included in the update metadata 228 of the web syndication item. If not, the synchronization summary 230 is updated with the information in the update metadata 228.

In an alternative embodiment, when the publisher A receives the updated media content from the subscriber B, embodiments of the invention enable the publisher A to determine whether there is a conflict between the two versions of the media content as a function of the update metadata 228 and the synchronization metadata 202. In this example, upon receiving the updated media content from the subscriber B, the publisher A compares the value in the "lastUpdater" in the updated media content from the subscriber B with the "lastUpdater" value in the original media content he or she included in the web syndication item. If the values are identical to each other, the publisher A may next compare the virtual clock values (e.g., the "sn" value) to determine which version is updated at a later time. If the "sn" value of the updated media content is greater than the "sn" value of the original media content, the updated media content is an updated version of the media content. If the "sn" value of the updated media content is less than or equal to the "sn" value of the original media content, the original media content is more up-to-date than the version from the subscriber B.

Alternatively, if the "lastUpdater" values are different, the publisher A may proceed to evaluate whether the update metadata 228 includes information (e.g., the "by" value) that matches the "lastUpdater" information in the version from the updated media content or vice versa. If it is included, there is no conflict as to which version is more recent. Otherwise, there is a conflict as to which version is the most recent.

In the example of the article created by the publisher A, the "lastUpdater" is different because the subscriber B has made changes to the original media content. As the publisher A examines the update metadata 228 of the updated media content, he or she would see that he or she created the media content before the subscriber B updates the media content. As such, there is no conflict and the synchronization summary 230 properly includes the complete update history of the media content, and the original media content is replaced by the updated media content.

In the situation where there is a conflict, in one embodiment, the publisher may be presented is presented with a list of arbitrary choices for resolving the conflicts via a UI (e.g., a UI 310). In one example, a conflict results when two endpoints or users make independent changes to a web syndication item without knowledge of the other's changes. One example to detect the conflict may be to examine the "lastUpdater" field (to be described in FIG. 4C in detail) in the synchronization metadata 202 and the "by" field of the update metadata 228. Other conflict detection mechanism or method may be employed without departing from the scope of the invention. In another aspect of the invention, the conflict detection mechanism may be disabled. In yet another alternative embodiment, the conflict detection mechanism may evaluate other and additional metadata or information associated with the web syndication item, the web syndication channel, or both. Other conflict detection and/or resolution mechanism and scheme may be used without departing from the scope of the invention.

Once the conflict is detected, the user may be provided with a list of options to select which version of the media content should be used as the prevailing version of the web syndication item. For example, the options may include:

1. Local version always prevails;
2. Remote version always prevails;
3. If the "lastUpdater" value of the remote version is equal to the original publisher, the remote version prevails. Otherwise, the local version prevails. Other conflict resolutions may be configured and customized by the users without departing from the scope of the invention.

Once the conflict is resolved, the prevailing version is updated in the update metadata 228, the synchronization metadata 202, and the synchronization summary 230. In an alternative embodiment, an optional conflict metadata is provided to indicate that a particular version is chosen or not chosen due to a conflict resolution technique.

In another alternative embodiment, if the publisher A wishes to delete the media content of the web syndication item, the publisher A may optionally enter information in the "deleted" field 208 and the synchronization metadata 202 will also include such deletion information as well.

Figure 3:
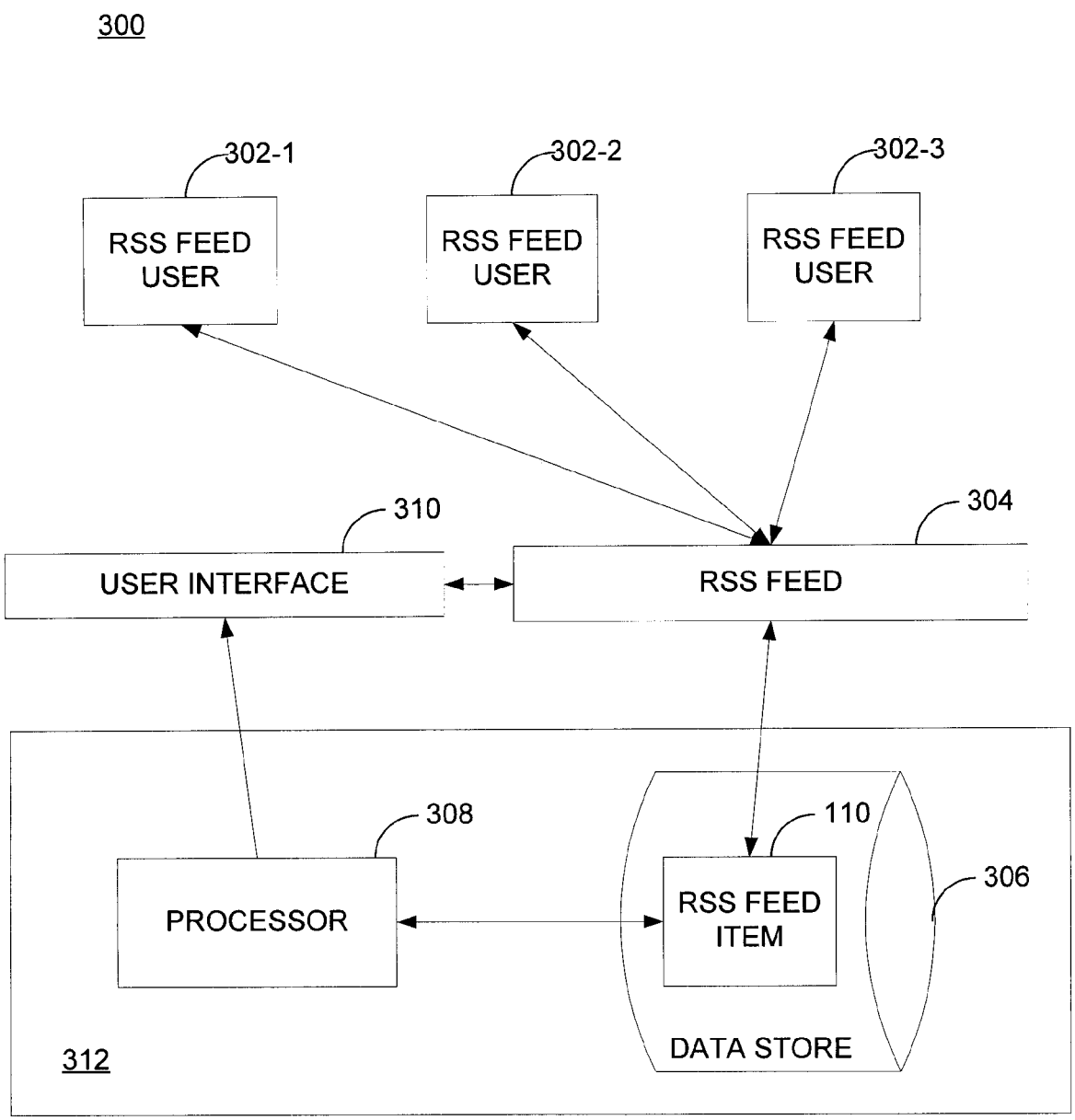
FIG. 3 is a block diagram illustrating a system for updating a synchronization summary of a web syndication channel according to an embodiment of the invention.

Referring now to FIG. 3, a block diagram illustrates a system 300 for updating the synchronization summary of a web syndication channel according to an embodiment of the invention. In this illustration, one or more web syndication users 302 subscribe to or contribute to a web syndication channel (e.g., RSS feed) 304. For example, the web syndication users 302 may both be publishers and subscribers as the web syndication users may update the web syndication item 110. The web syndication item 110 may stored in a data store 306 and made available at a server computer 312 after it is first published. For example, the web syndication item 110 may be available at a web site maintained by a publisher and a processor 308 executes computer-executable instructions for processing interactions between the web syndication users 302 and the web syndication item 110.

In another embodiment, the processor 308 is configured to manage a user interface (UI) 310 for providing interactions between the web syndication users 302 and the web syndication item 110. For example, the UI 310 may present or trigger a dialog window, such as the window 214 in FIG. 2B, to the web syndication users 302. In another embodiment, the UI 310 may project parts of the update metadata 228 or the synchronization metadata 202 to the web syndication users 302 to affect a synchronous update to the web syndication item 110. It is also understood that each of the web syndication users 302 may be physically located in a location remote from the server computer 312 or other web syndication users 302.

In the event that there are various versions of the web syndication item 110, the synchronization summary 230 properly includes information indicated in the update metadata 228 and the synchronization metadata 202 of each version of the web syndication item 110. For example, suppose a first version of the web syndication item and a second version of the web syndication item are received (e.g., at the first device 102, the second device 104, or the server computer 312). The first version of the web syndication item indicates a first update to the web syndication item and the second version of the web syndication item indicates a second update to the web syndication item. The synchronization summary 230 is defined (if it is not already defined) for the web syndication channel, and the synchronization summary 230 describes a history associated with all web syndication item for a given web syndication channel. The synchronization metadata 202 for each of the versions of the web syndication item 110 is aggregated and the order of the aggregated synchronization metadata is determined. The synchronization summary 230 is next updated with the determined order of the synchronization metadata from the versions of the web syndication item.

In one embodiment, the synchronization summary 230 merges the synchronization metadata from all versions of the web syndication item. In this example, suppose the synchronization summary 230 is merging synchronization metadata 202 from two versions of the web syndication item 110 and suppose one of the two versions has already been determined to prevail over the other (e.g., using one or more conflict resolution techniques described above). The synchronization summary 230 first set the "lastUpdater" value in the synchronization summary 230 to be equal to the prevailing "lastUpdater". Next, for each update entry in the update metadata 228 of the two versions, the synchronization summary 230 includes each update entry in both versions that has a common "by" attribute and applies the greater "sn" value from the two versions to the synchronization summary 230.

For example, if both versions include in their update metadata that publisher A is in one of the "by" field, but the prevailing version has a "sn" value of 250 while the non-prevailing version has a "sn" value of 200. In this situation, the synchronization summary would have the entry: "by"="publisher A", "sn"="250".

Also, the synchronization summary 230 adds the remaining update entries in the update metadata 228 that are not common to both versions.

In yet another embodiment, the server computer 312 may include a copy of each of the versions of the web syndication item 110 enumerated in the synchronization summary 230 such that the users may select various versions of the web syndication item 110.

Figure 4A:
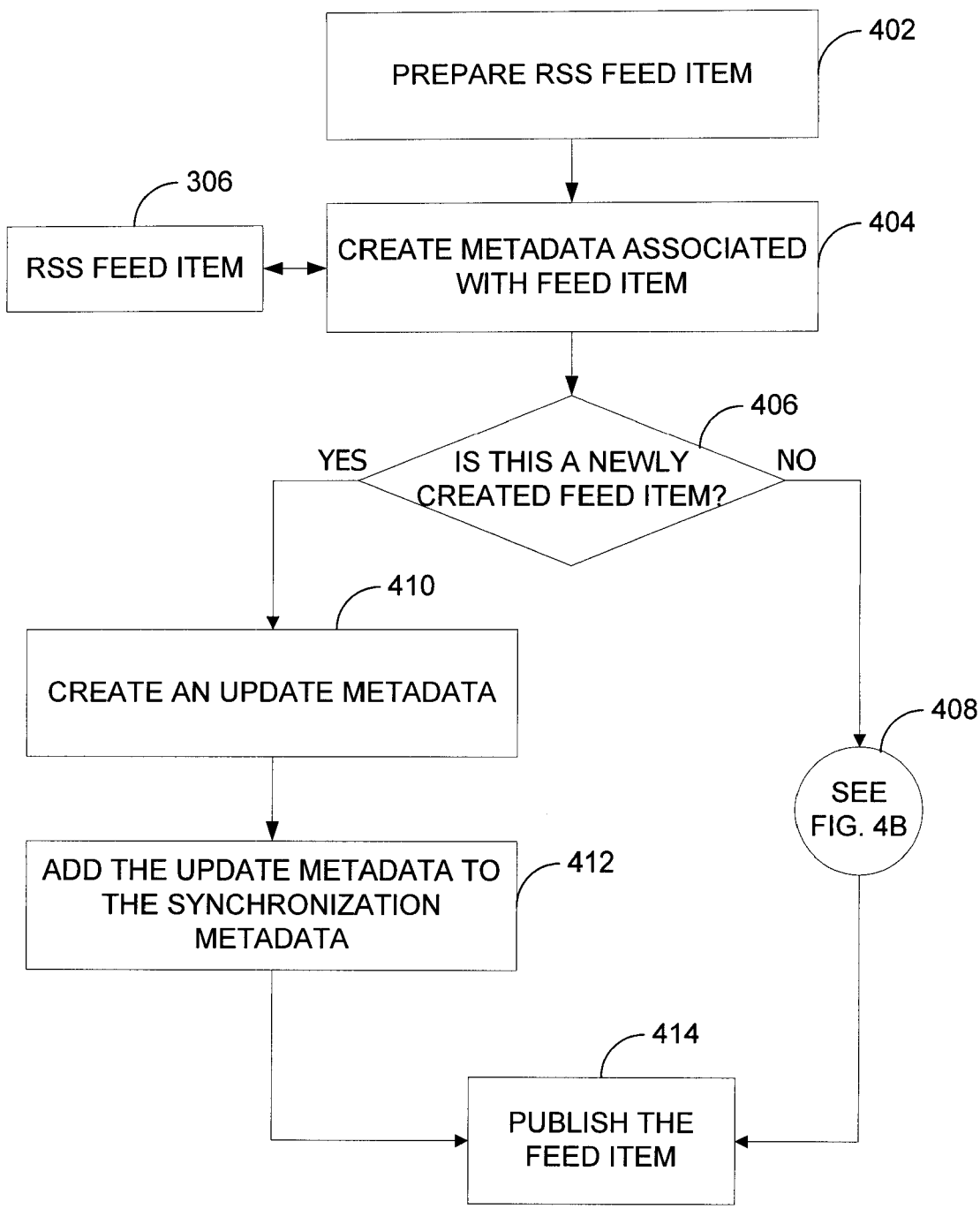
FIGS. 4A to 4C are flow charts illustrating synchronizing a web syndication item and a web syndication channel according to an embodiment of the invention.
Figure 4B:
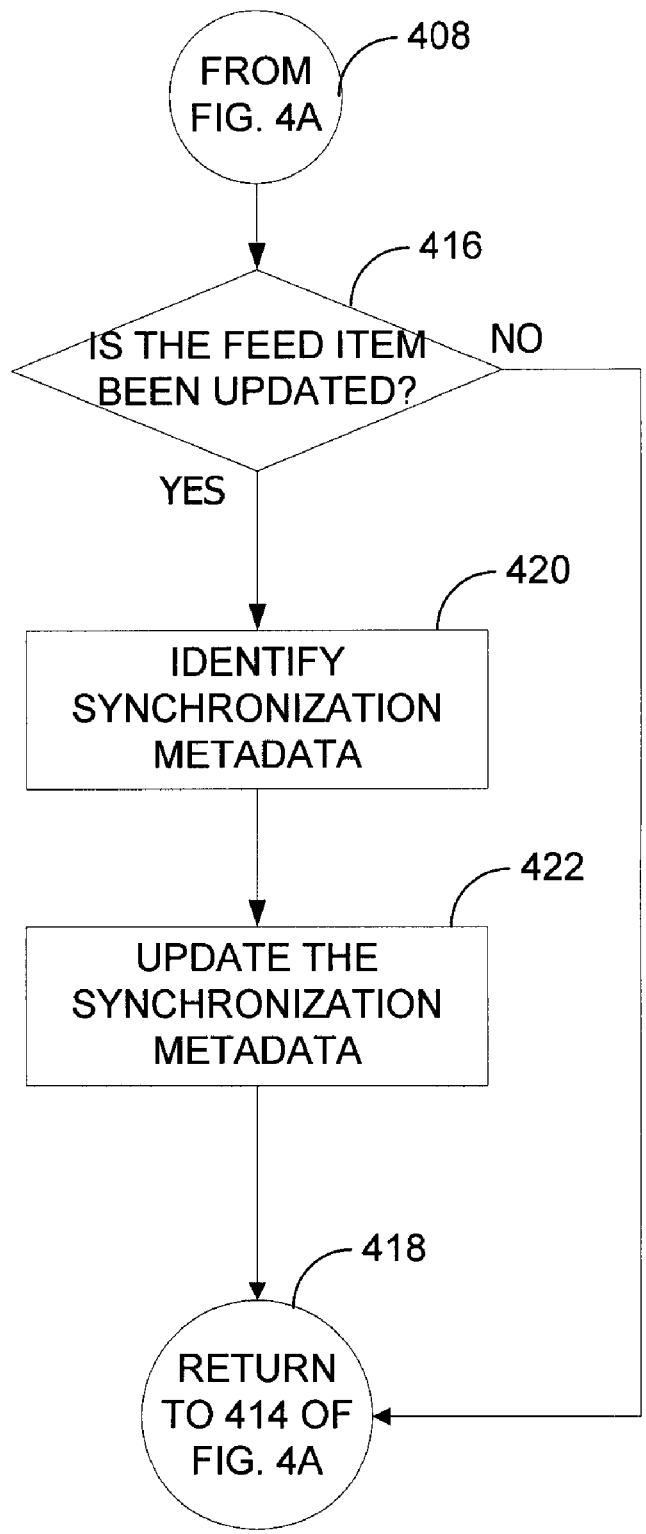
Figure 4C:
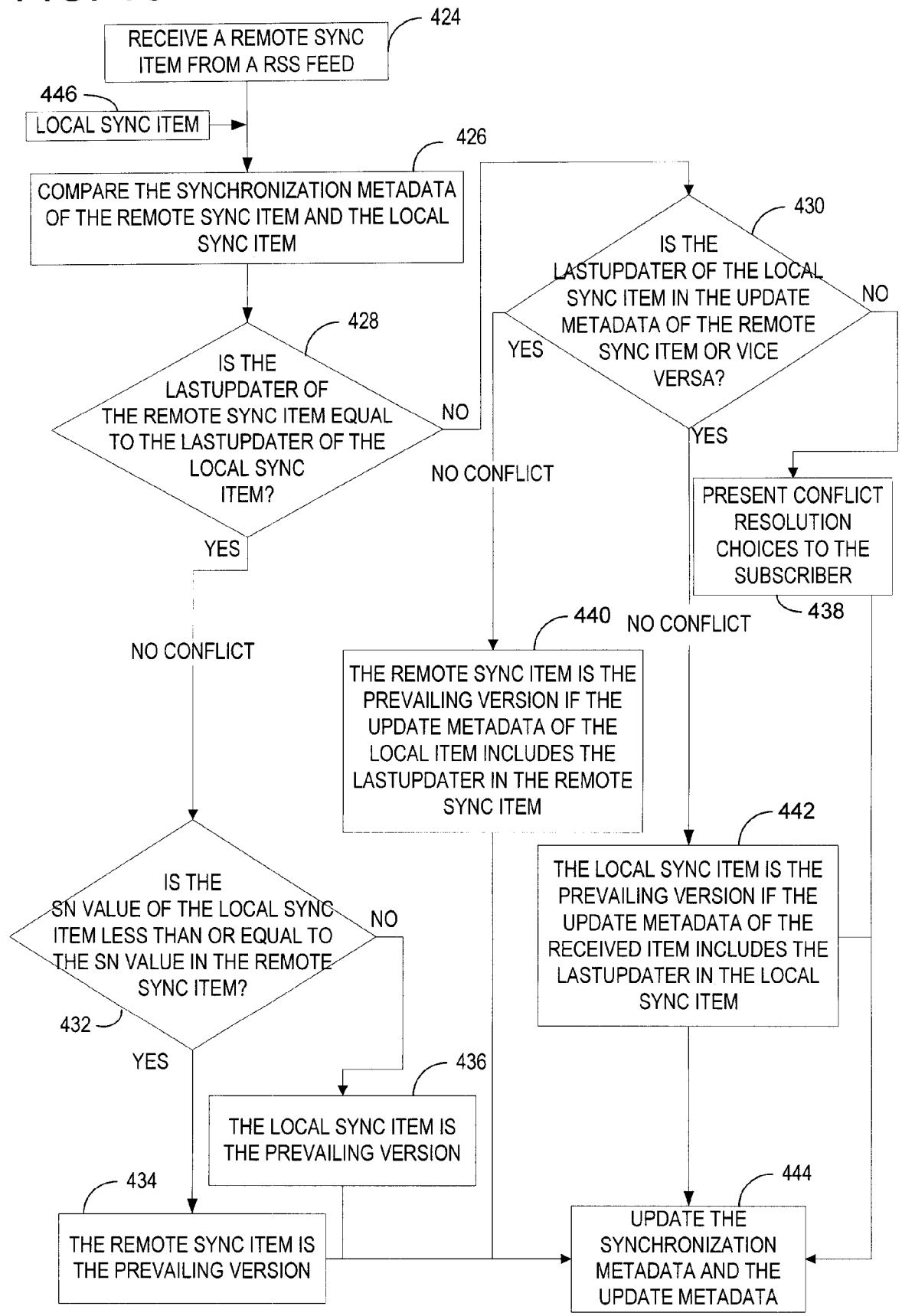

Referring now to FIG. 4A to 4C, flow charts illustrating operations of synchronizing a web syndication item and a web syndication channel according to an embodiment of the invention. FIG. 4A illustrates a flow chart for creating a web syndication item having synchronization metadata embedded therein. At 402, a user (e.g., publisher A) prepares a web syndication item (e.g., RSS feed item) by associating or including a media content (e.g., a document article) therein. At 404, the user creates or generates the appropriate metadata associated with the web syndication item. For example, the user may enter the fields in the synchronization metadata (e.g., fields in the <history> child element>). At 406, it is to be determined whether the web syndication item is been created for the first time by examining the update metadata of the web syndication item. If the web syndication item is been created for the first time, the update metadata is created at 410. The user enters the appropriate information in the update metadata, such as the "by" field and the "sn" value at 412. The user next publishes the web syndication item at 414.

If it is determined that the web syndication item is not a newly created item, FIG. 4B illustrates how the user proceeds to 408 to further perform operations for updating metadata associated with the web syndication item. For example, the user, which may either be the publisher A or the subscriber B, may have updated an existing media content of the web syndication item. As such, at 416, it is to be determined whether the web syndication item is been updated. If there is no update needed, the user returns to 414 of FIG. 4A at 418. If the web syndication item is been updated, the synchronization metadata is identified at 420.

For example, the synchronization metadata according to embodiments of the invention includes at least the following: a <history> child element and a list of <update> elements (see FIG. 2A above for additional details). Once identified, the user may update the update metadata and the synchronization metadata of the web syndication item at 422. For example, the user would enter information, such as the "by" value, the "sn" value, and the "lastUpdater" value. Optionally, the user may enter information to indicate whether the web syndication item is to be deleted.

Referring now to FIG. 4C, a flow chart illustrates operations for synchronizing one or more versions of the web syndication item as a function of the synchronization metadata and the update metadata according to an embodiment of the invention. For illustration purpose only and not by limitation, a local sync item 446 represents a version of the web syndication item while a remote sync item represents another version of the web syndication item. At 424, the user (e.g., publisher A, subscriber B, or server computer 312) receives the remote sync item. At 426, the synchronization metadata of the local sync item 446 is compared to the synchronization metadata of the remote sync item. At 428, it is to be determined whether the "lastUpdater" value of the remote sync item equals to the "lastUpdater" value of the local sync item. If the values are the same, it is determined that there is no conflict. The next step is to determine which version should be used as the prevailing version at 432. According one technique, if the "sn" value of the local sync item is less than or equal to the "sn" value of the remote sync item, the remote sync item is the prevailing version at 434. If the "sn" value of the remote sync item is less than or equal to the "sn" value of the local sync item, the local sync item should prevail at 436.

On the other hand, if the "lastUpdater" values of the local and remote sync items are not the same, it is to be determined whether the "lastUpdater" of the local sync item is in the update metadata of the remote sync item at 430. For example, in determining whether the "lastUpdater" of the local sync item is in the update metadata of the remote sync item, the "sn" field (e.g., the virtual clock value) of the local sync item is compared with the "sn" field of the remote sync item. In another example, other virtual or logical clock value or representation may be used such that the virtual or logical clock value may be used as a clock vector containment check to determine which version (i.e., the local sync item or the remote sync item) should prevail.

If the determination is positive, the remote sync item is the prevailing version at 440. On the other hand, if the "lastUpdater" of the remote sync item is in the update metadata of the local sync item, the local sync item is the prevailing version. If the "lastUpdater" value is not found in the update metadata of either version of the web syndication item, there is a conflict and the user is presented with a various options to resolve the conflict at 438. Once the prevailing version is determined or the conflict is resolved, the synchronization metadata and the update metadata are updated in 444 to include the appropriate information from the prevailing version.

Figure 5:
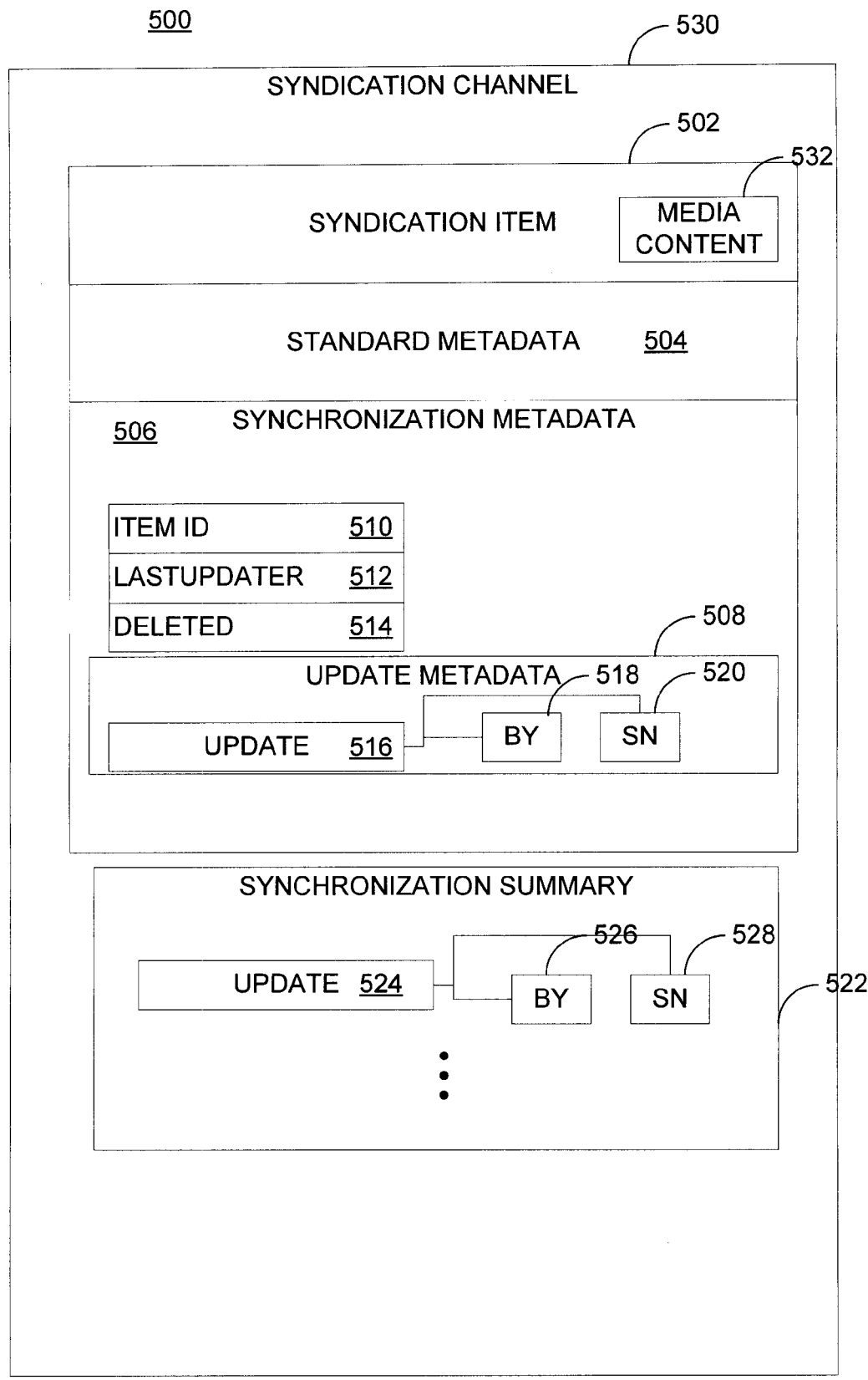
FIG. 5 is a block diagram illustrating a data structure enabling synchronization of a web syndication item according to an embodiment of the invention.

FIG. 5 illustrates a data structure 500 enabling synchronization of a web syndication item according to an embodiment of the invention. In one example, a syndication channel 530 may include one or more syndication items, such as syndication item 502. The syndication item 502 includes a media content 532 and related data or metadata associated with the media content 532. The data structure 500 also includes a set of standard metadata 504, such as in the form of XML tags. The data structure 500 includes synchronization metadata 506 for synchronizing versions of the media content 532. For example, the synchronization metadata 506 is represented as a <history> child element in XML format and includes the following fields: an itemID field 510, a lastUpdater field 512, and an optional deleted field 514. The synchronization metadata 506 also includes update metadata 508 which includes one or more update fields 516. Each update field 516 includes the following sub-fields: "by" and "sn".

The syndication channel 530 also includes a synchronization summary 522 (and standard metadata 230 as shown in FIG. 2C) which further includes one or more update fields 524. Each syndication item 502 includes a synchronization summary, which includes all updates made to the syndication item 502. Each of the update fields 524 also includes the following sub-fields: "by" and "sn".

Figure 6:
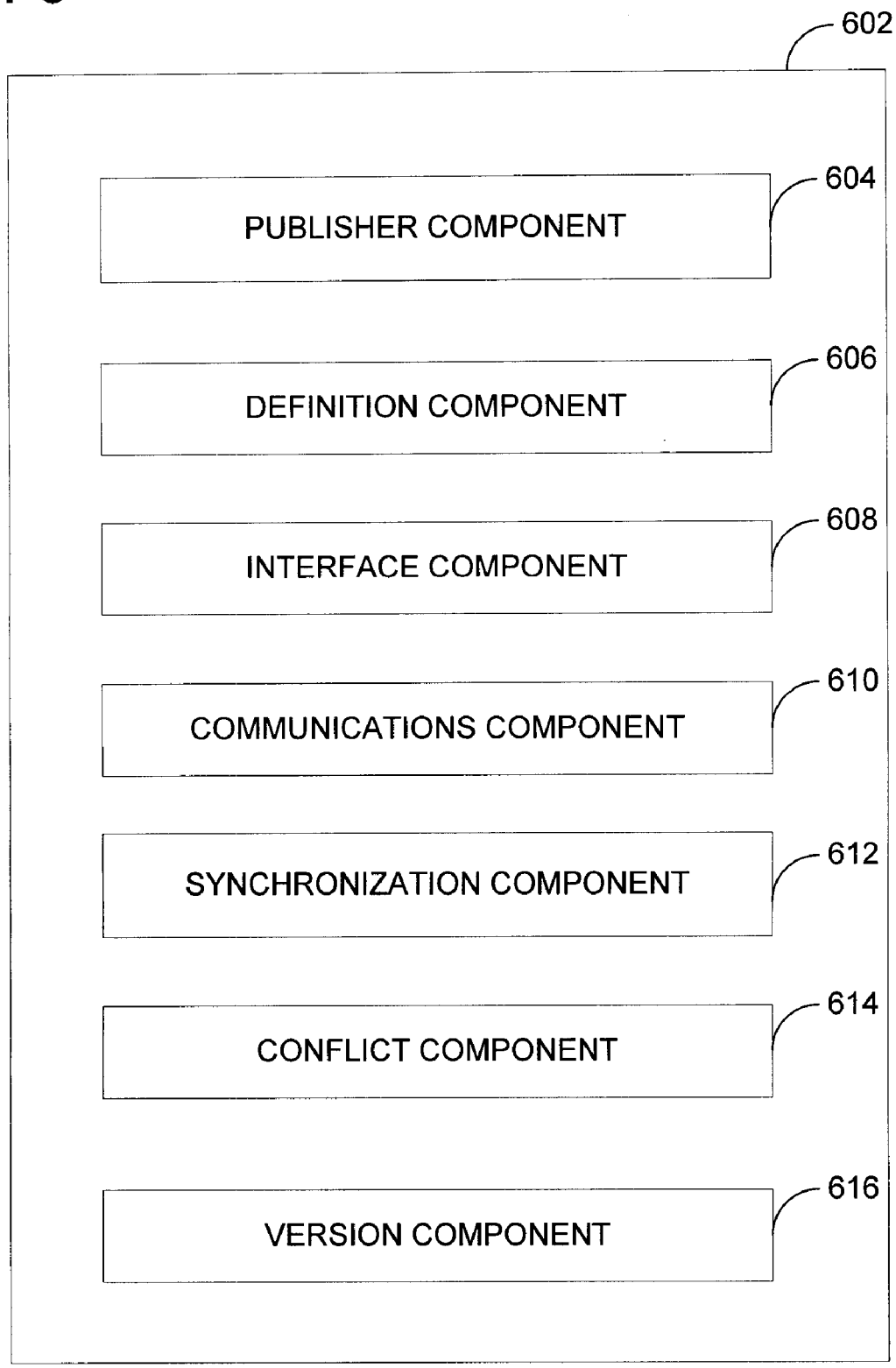
FIGS. 6 and 7 are block diagrams illustrating an exemplary computer-readable medium on which aspects of the invention may be stored.

FIG. 6 is a block diagram illustrating an exemplary computer-readable medium 602 on which aspects of the invention may be stored. For example, the computer-readable medium 602 includes a publisher component 604 for publishing a web syndication item including a media content associated therewith. A definition component 606 defines a synchronization metadata including a first virtual clock value associated with the published web syndication item, said first virtual clock value indicating when the web syndication was last updated. The computer-readable medium 602 also includes an interface component 608 for receiving a request for subscribing to the published web syndication item from the subscriber. A communications component 610 transmits in response to the received request the published web syndication item to a location remote from the publisher and accessible by the subscriber. The interface component 608 provides the syndication metadata including the first virtual clock value to the subscriber, and a synchronization component 612 permits the subscriber to modify (e.g., increment) the first virtual clock value when the subscriber modifies the media content at the location remote from the publisher.

In one embodiment, the synchronization component 612 permits the subscriber to add a new virtual clock value in lieu of modification. In yet another embodiment, a conflict component 614 may detect a version of the web syndication item at the location remote from the publisher when the published web syndication item is transmitted to the location. In an alternative embodiment, the conflict component 614 may determine whether a published web syndication item creates a conflict with the version of the web syndication item at the location remote from the publisher detected by the conflict component 614. The conflict component 614 may present one or more choices to the subscriber to resolve the conflict or may resolve the determined conflict via automated or preset preferences. In yet another alternative embodiment, a version component 616 may provide one or more versions to the subscriber according to the list of the modification history included in the synchronization metadata.

Figure 7:
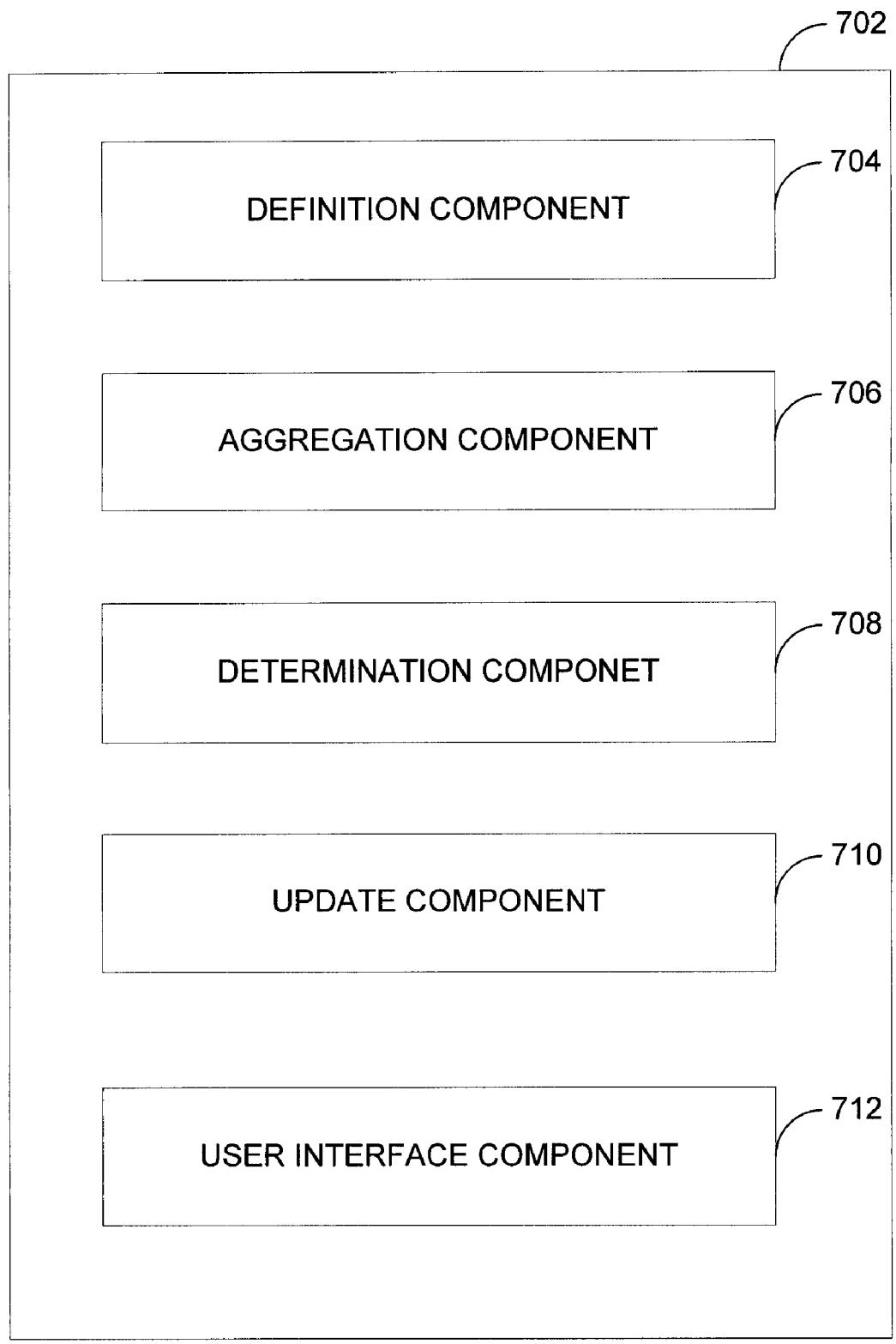

FIG. 7 is a block diagram illustrating an exemplary computer-readable medium 702 on which alternative aspects of the invention may be stored. For example, the computer-readable medium 702 includes a memory component 704 for defining a synchronization summary for a web syndication subscription and web synchronization metadata for one or more versions of a web syndication item over the web syndication channel. An aggregation component 706 aggregates the web synchronization metadata of the one or more versions of the web syndication item from users in the web synchronization summary. For example, the one or more versions of the web syndication item include one or more updates by the users and various time periods, which may be included in the web syndication metadata, associated with the updates.

The computer-readable medium 702 also includes a determination component 708 for determining the order of the one or more aggregated web synchronization metadata of the versions in the synchronization summary as a function of the indicated updates and the various time periods. An update component 710 updates the web synchronization summary according to the determined order such that the one or more aggregated versions are provided to the users. In an alternative embodiment, a UI component 712 provides the one or more aggregated versions in the determined order to the users.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method for updating a web syndication channel over a Really Simple Syndication (RSS) format, said method comprising:

transmitting a web syndication item from a computing device to a first user based on a web subscription of the web syndication item over the web syndication channel, said web syndication item including web synchronization metadata with original update metadata, said web synchronization metadata being provided to the first user for modification when updating the web syndication item to a first version of the web syndication item;

transmitting the web syndication item from the computing device to a second user based on a web subscription of the web syndication item over the web syndication channel, said web syndication item including the web synchronization metadata with the original update metadata, said web synchronization metadata being provided to the second user for modification when updating the web syndication item to a second version of the web syndication item;

receiving at the computing device the first version of the web syndication item from the first user and the second version of the web syndication item from the second user, said computing device having a processor executing the computerized method, said first version of the web syndication item indicating a first update to the web syndication item and said second version of the web syndication item indicating a second update to the web syndication item, said first version being different from the second version and the first version being received at the same time when the second version is received, said web syndication channel being a RSS syndication channel, said web syndication item being a RSS syndication item;

determining if a synchronization summary for the web syndication channel is present at the computing device, said synchronization summary for the web syndication channel being a RSS synchronization summary and describing synchronization information associated with the web syndication item;

if the synchronization summary is not present, defining the synchronization summary for the web syndication channel, said defined synchronization summary describing information associated with the web syndication item, said defined synchronization summary including at least the following information: a web syndication item number, and an identifier of a user who last updated the web syndication item, said update metadata including a list of updates having at least the following information: a user of the update and a time value indicating when the update is recorded;

if the synchronization summary is present, identifying the synchronization summary for the web syndication channel;

aggregating the web synchronization metadata associated with first version from the first user and the second version of the web syndication item from the second user to be stored in the synchronization summary;

determining an order of the aggregated web synchronization metadata of the versions in the synchronization summary as a function of the indicated first update and the indicated second update; and updating the synchronization summary according to the determined order such that the one or more aggregated versions are provided to users.

2. The method of claim 1, wherein determining comprises analyzing synchronization metadata associated with the first version and the second version of the web syndication item, said synchronization metadata including virtual clock values corresponding to versions of the web syndication item.

3. The method of claim 2, wherein analyzing comprises comparing each of the virtual clock values of each of the versions of the web syndication item to determine the order of the one or more aggregated versions in the syndication summary.

4. The method of claim 1, further comprising detecting a conflict between the first version and the second version of the web syndication item, said conflict indicating that the versions of the web syndication item is different as a function of the first version, the second version, the first virtual clock value, the second virtual clock value and a user who last updates the web syndication item.

5. The method of claim 4, wherein updating comprises merging the web synchronization metadata of the first version with the web synchronization metadata of the second version in the web syndication summary if there is no conflict.

6. The method of claim 4, further comprising providing to the users a result of conflict resolution performed by the users.

7. The method of claim 1, further comprising presenting a user interface (UI) for the user to enter the update metadata.

8. A system for synchronizing a web syndication item transmitted based on a web syndication subscription over a Really Simple Syndication (RSS) format, said system comprising:
- a data store for storing a web syndication summary for the web syndication subscription and web synchronization metadata for one or more versions of the web syndication item, said web syndication subscription being a RSS syndication subscription, said web syndication item being a RSS syndication item, said synchronization summary for a web syndication channel being a RSS synchronization summary and describing synchronization information associated with the web syndication item, said web syndication item including at least one of the following: a text file, an image file, and a multimedia file;
- a processor configured for executing computer-executable instructions for: transmitting the web syndication item from a computing device to one or more users based on a web subscription of the web syndication item over the web syndication channel, said web syndication item including a web synchronization metadata with original update metadata;
- providing the web synchronization metadata to users for modification when updating the web syndication item to one or more versions of the web syndication item;
- defining the synchronization summary for the web syndication subscription to include information associated with the web syndication item, said defined synchronization summary web including at least the following information: a web syndication item number, and an identifier of a user who last updated the web syndication item, said web synchronization update metadata including a list of updates having at least the following information: a user of the update and a time value indicating when the update is recorded;
- aggregating the web synchronization metadata of the one or more versions of the web syndication item from the users in the web synchronization summary, said one or more versions of the web syndication item indicating one or more updates by the users at various time periods;
- determining an order of the one or more aggregated web synchronization metadata of the versions in the synchronization summary as a function of the indicated first update and the indicated second update and the various time periods; and
- updating the web synchronization summary according to the determined order such that the one or more aggregated versions are provided to the users.

9. The system of claim 8, further comprising a user interface (UI) for providing the one or more aggregated versions in the determined order to the users.

10. The system of claim 8, wherein each of the versions of the web syndication item includes the web synchronization metadata describing a history of updates to the web syndication item by the users.

11. The system of claim 8, wherein the web synchronization metadata includes metadata identifying a user who last updates the web syndication item and metadata describing a time period when the last update is performed.

12. The system of claim 8, wherein the processor is configured to merge the web synchronization metadata of the one or more versions with the web syndication item in the web syndication summary.

13. The system of claim 9, wherein the UI provides entry forms for the users to enter the update metadata.

* * * * *

UNITED STATES PATENT AND TRADEMARK OFFICE
CERTIFICATE OF CORRECTION

PATENT NO.        : 7,653,640 B2                                        Page 1 of 1
APPLICATION NO. : 11/461351
DATED             : January 26, 2010
INVENTOR(S)       : Khosravy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 351 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,653,640 B2
APPLICATION NO. : 11/461351
DATED : January 26, 2010
INVENTOR(S) : Moe Khosravy et al.

It is certified that error appears in the above-identified patent and that said Letters Patent is hereby corrected as shown below:

In column 13, line 38, in Claim 8, after "summary" delete "web".

In column 14, line 3, in Claim 8, after "synchronization" delete "update".

Signed and Sealed this
Eighth Day of February, 2011

David J. Kappos
*Director of the United States Patent and Trademark Office*